United States Patent [19]

Blaushild et al.

[11] Patent Number: 5,058,762

[45] Date of Patent: Oct. 22, 1991

[54] SHIPPING DEVICE FOR HEATER UNIT ASSEMBLY

[75] Inventors: Ronald M. Blaushild, Export; Stephan L. Abbott, Monroeville; Phillip E. Miller, Greensburg; Robert Shaffer, Swissvale, all of Pa.

[73] Assignee: The United States of America as represented by the United States Department of Energy, Washington, D.C.

[21] Appl. No.: 368,498

[22] Filed: Jun. 19, 1989

[51] Int. Cl.⁵ .............................................. B65D 53/00
[52] U.S. Cl. ..................................... 220/378; 248/676
[58] Field of Search ................. 220/378; 206/583, 592; 248/676, 608, 130, 133, 311.2

[56] References Cited

U.S. PATENT DOCUMENTS

| | | | |
|---|---|---|---|
| 4,465,201 | 8/1984 | Chalfant, Jr. | 220/378 X |
| 4,541,537 | 9/1985 | Sailor | 220/378 X |
| 4,574,955 | 3/1986 | Camossi | 206/583 |
| 4,699,293 | 10/1987 | Duchrow | 220/378 |
| 4,714,228 | 12/1987 | Blaushild | 248/608 |
| 4,719,892 | 1/1988 | Lopez-Crevillen | 220/378 X |
| 4,739,899 | 4/1988 | Thompson et al. | 220/378 X |
| 4,758,402 | 7/1988 | Schukey et al. | 220/378 X |
| 4,815,630 | 3/1989 | Jenson et al. | 220/378 |

*Primary Examiner*—Ramon O. Ramirez
*Attorney, Agent, or Firm*—E. F. Possessky

[57] ABSTRACT

A shipping device for a heater unit assembly (23), the heater unit assembly (23) including a cylindrical wall (25) and a top plate (31) secured to the cylindrical wall (25) and having a flange portion which projects radially beyond the outer surface of the cylindrical wall (25), and the shipping device including: a cylindrical container (3) having a closed bottom (13); a support member (47) secured to the container (3) and having an inwardly directed flange for supporting the flange portion of the top plate (31); a supplemental supporting system (1) for positioning the heater unit assembly (23) in the container (3) at a spaced relation from the inner surface and bottom wall (13) of the container (3); a cover (15) for closing the top of the container (3); and a container supporting structure (5,7,8) supporting the container (3) in a manner to permit the container (3) to be moved, relative to the supporting structure (5,7,8), between a vertical position for loading and unloading the assembly (23) and a horizontal position for transport of the assembly (23). A seal (57) is interposed between the container (3) and the cover (15) for sealing the interior of the container (3) from the environment. An abutment member (41) is mounted on the container supporting structure (5,7,8) for supporting the container bottom (13), when the container (3) is in the vertical position, to prevent the container (3) from moving past the vertical position in the direction away from the horizontal position, and a retainer member (55) is secured within the cover (15) for retaining the assembly top plate (31) in contact with the support member (47) when the cover (15) closes the top of the container (3).

9 Claims, 2 Drawing Sheets

SHIPPING DEVICE FOR HEATER UNIT ASSEMBLY

This invention was made under government contract, and the Federal Government may have rights in the subject invention.

CROSS REFERENCE TO RELATED APPLICATIONS

The following applications disclose subject matter which is related to the present invention. Since none of these applications have as yet been assigned a serial number, they are identified by title, and the Westinghouse Electric Corporation Docket Number:

MODULAR ANNEALING APPARATUS FOR IN SITU REACTOR VESSEL ANNEALING AND RELATED METHOD OF ASSEMBLY—54,690

WATER FILLED TANKS FOR TEMPORARY SHIELDING OF REACTOR VESSEL INTERNALS AND METHOD OF ASSEMBLY—54,691

COFFER DAM FOR TEMPORARY SHIELDING OF REACTOR VESSEL INTERNALS AND METHOD OF ASSEMBLY—54,692

REACTOR VESSEL ANNEALING SYSTEM—53,611

ANNEALING UNIT INSERTION AND REMOVAL SYSTEM—53,917

HEATING EQUIPMENT INSTALLATION SYSTEM AND METHOD—53,878

TEMPERATURE MONITORING DEVICE AND THERMOCOUPLE ASSEMBLY THEREFOR—54,105

ELECTRIC RESISTANCE HEATER UNIT ASSEMBLY—54,133

REACTOR VESSEL NOZZLE THERMAL BARRIER—53,820

MONITORING AND CONTROL OF REACTOR VESSEL HEAT TREATMENT—54,138

BACKGROUND OF THE INVENTION

The present invention relates to a shipping device constructed particularly for transporting a heater unit assembly which is to be employed in a reactor vessel annealing treatment.

The device according to the present invention is based on the structure disclosed in my U.S. Pat. No. 4,714,228, which issued on Dec. 22, 1987. That patent was directed to a support structure for use in transporting a cylindrical container, such as a nuclear reactor component.

It is known that the pressure vessels of nuclear reactors experience a phenomenon known as embrittlement due to their exposure to neutron radiation and that the adverse effects of this phenomenon can be reversed by subjecting the pressure vessel to an annealing treatment. Since it is impractical to remove such a pressure vessel for transport to an annealing facility, it has been proposed to transport annealing equipment to the reactor site.

Certain proposed annealing equipment includes a heater unit assembly which has the general configuration and size of the interior of the reactor pressure vessel and is provided with an array of heater units disposed to effect uniform heating of the pressure vessel. In order to utilize a heater unit assembly, it is, of course, necessary to transport it to the reactor site while protecting the assembly against damage.

SUMMARY OF THE INVENTION

It is an object of the present invention to provide a shipping device for over-the-road transport of such a heater unit assembly to and from a reactor site.

A more specific object of the invention is to provide a device which will store the heater unit assembly in a sealed manner in order to prevent the assembly from being exposed to moisture and air-borne pollutants which could cause corrosion or other damage to the heater unit assembly, and to prevent the escape of any radiation products which the heater unit assembly may have acquired during an annealing treatment.

A further specific object of the invention is to provide a device which can be pivoted between a vertical orientation, for loading and unloading the heater unit assembly, and a horizontal orientation, for transport, and which is prevented from being inadvertently moved past its vertical orientation.

DESCRIPTION OF THE PREFERRED EMBODIMENTS

Figure 1:
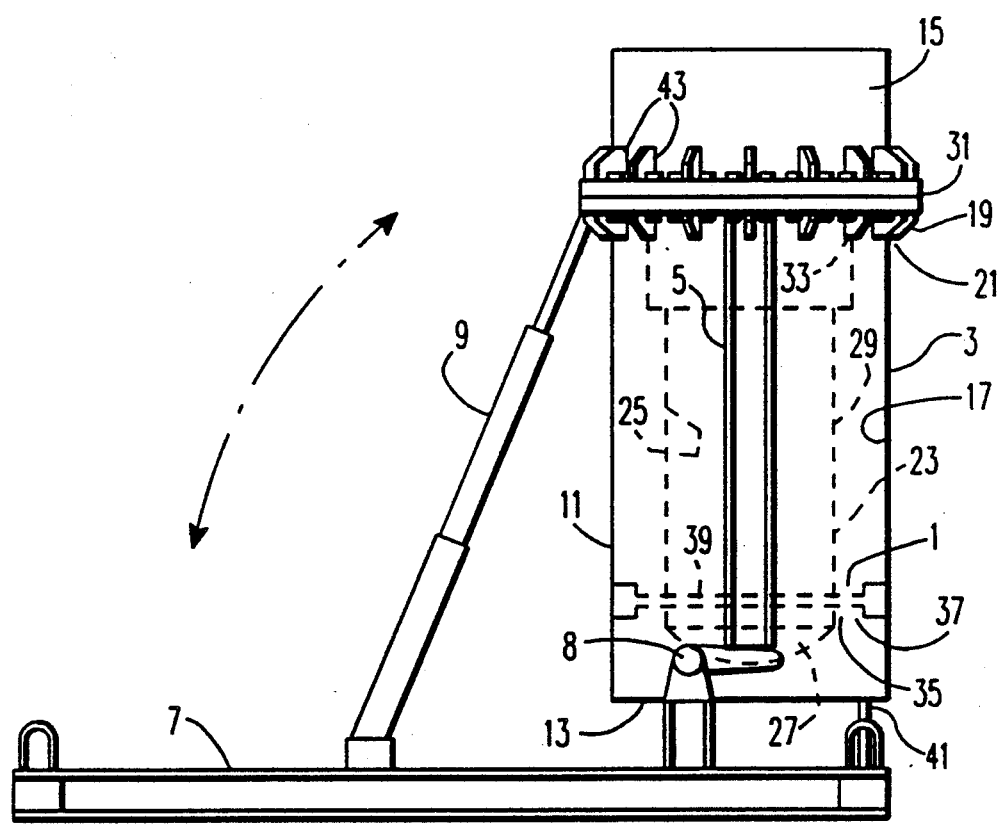
FIG. 1 is a partial, vertical cross-sectional view of a shipping device embodying improvements according to the present invention, in its vertical position, with an inserted heater unit being shown in broken lines.
Figure 2:
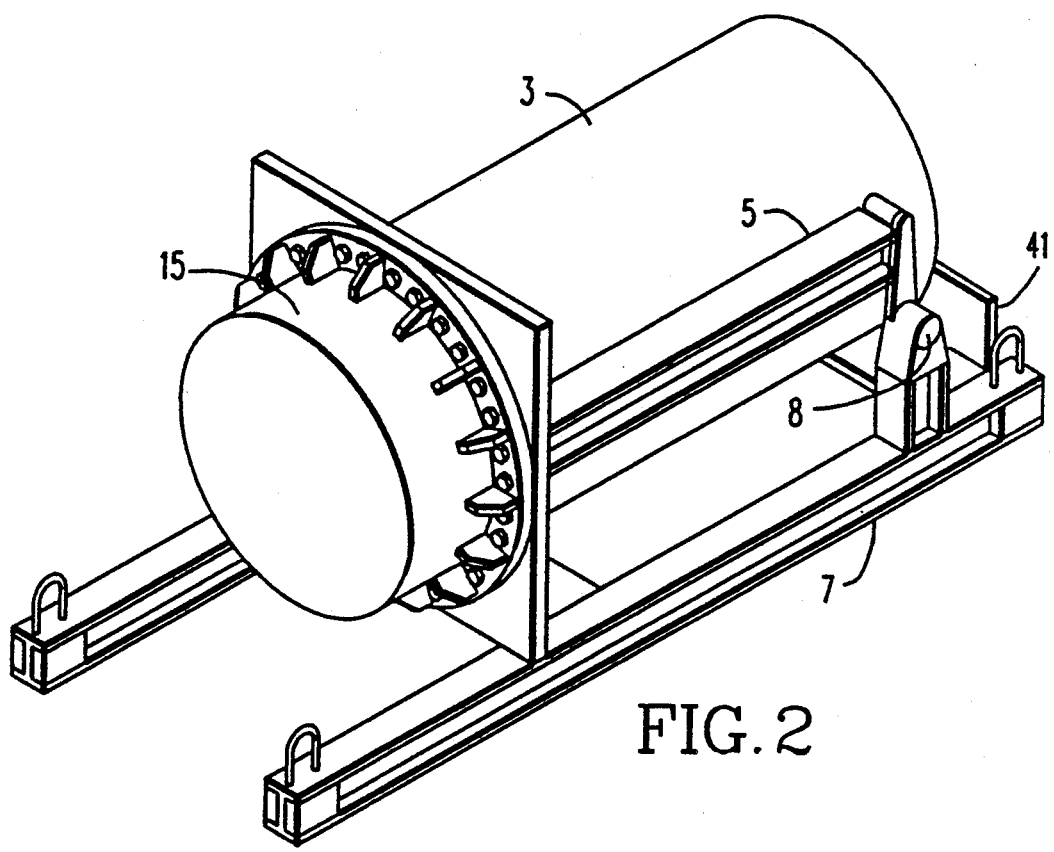
FIG. 2 is a perspective view illustrating the device of FIG. 1 in its horizontal position.

The structure shown in FIG. 1 includes a self-adjustable supporting system 1 secured at the interior lower region of a cylindrical container 3 which is supported on pivot arms 5 attached to horizontal support rails 7. Pivot arms 5 are provided with pivot joints 8 (FIG. 2) which enable container 3 to be pivoted between a vertical loading/unloading position, shown in FIG. 1, to the horizontal transport position shown in FIG. 2.

When container 3 is in the vertical position, it is held in that position by support members 9 which can be detachably secured to rails 7.

Housing 3 is composed of a cylindrical side wall 11 and a flat bottom 13. Container 3 is closed by a removable cover, or cap, 15.

Side wall 11 of container 3 has an inner surface 17 carrying at its upper end a circular support beam 19 of square cross section. Beam 19 extends about the upper region 21 of container 3 and serves to support a heater unit assembly 23, in a manner to be described in detail below. Assembly 23 has a wall 25 and a dome-shaped bottom 27. Wall 25 has an external surface 29 and heater unit assembly 23 is provided at its upper end with a top plate 31 projecting radially outwardly from wall 23 at the upper region 33 of assembly 23.

Supporting system 1 includes bracket units 35 installed on external surface 29 of wall 25 and supporting bar units 37 secured to housing 3. Bracket units 35 include a support ring 39 secured to, or bearing against, surface 29. The structure of supporting system 1, as well as other details of the container and the support therefor are disclosed in detail in U.S. Pat. No. 4,714,228.

During movement of container 3 to the vertical position shown in FIG. 1, which can be achieved with the aid of a lifting device secured to shackles at the upper edge of container 3, it is possible for container 3 to move past the vertical position illustrated in FIG. 1, and there could be difficulty in bringing container 3 precisely to its vertical position, which is required for safe insertion and removal of heater unit assembly 23. In order to facilitate accurate placement of container 33 in its vertical position, there is provided, according to the present invention, a horizontally extending support beam 41 which is positioned and dimensioned to support bottom 13 of container 3 when container 3 is in a defined vertical position. Thus, the application of a force which urges container 3 away from the horizontal transport position shown in FIG. 2 will bring bottom 13 into bearing relation with beam 41, thereby precisely defining the desired vertical position of container 3.

Container 3 is stabilized in the vertical position by the offset arrangement of pivot arms 5, as shown in FIG. 1.

A heater unit assembly 23 of the type which is to be received by container 3 should have a defined alignment position when installed in container 3. The top plate 31 of heater unit assembly 23 is provided, at its periphery, with alignment openings for permitting the heater unit assembly to be correctly installed in a reactor vessel.

According to a further feature of the invention, container 3 is provided with two alignment columns 43 positioned to engage the alignment openings in top plate 31 in order to correctly align heater unit assembly 23 in container 3.

Figure 3:
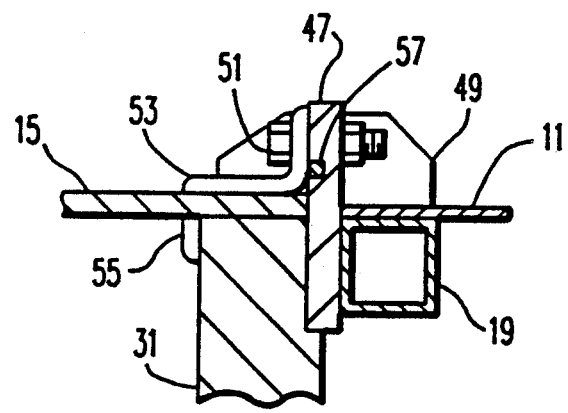
FIG. 3 is a cross-sectional detail view of a portion of the device shown in FIGS. 1 and 2.

Further details of the structure according to the present invention are shown in FIG. 3. At the top of side wall 11, container 3 is provided with a horizontal circular plate 47 which rests upon beam 19 and which is secured to the outer surface of wall 11 by plate 49, which may be welded to wall 11 and to plate 47. When heater unit assembly 23 is installed in container 3, top plate 31 rests upon plate 47.

Cover 15 is secured to container 3 by means of bolts 51 extending through an outwardly projecting flange 53 of cover 15. Flange 53 is defined by a circular piece of L-shaped cross section welded to cover 15.

In order to reliably maintain heater unit assembly 23 in place, there is welded to the interior surface of cover 15 a retaining plate 55 which is located to clamp top plate 31 against plate 47 when cover 15 is secured to plate 47.

In further accordance with the invention, plate 47 is provided, outside of the region enclosed by wall 11 and cover 15, with a circular groove extending from its upper surface and is provided, in the groove, with an O-ring 57 of a suitable sealing material, such as Neoprene, for establishing an hermetically sealed joint between container 3 and cover 15 to thereby prevent moisture and atmospheric pollutants from entering container 3, as well as preventing the escape of radioactive products which may have been acquired by heater unit assembly 23.

If desired, several concentric grooves and O-rings may be provided, or other known sealing arrangements can be employed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a shipping device for a heater unit assembly, the heater unit assembly including a cylindrical wall having an outer surface and a top plate secured to the cylindrical wall and having a flange portion which projects radially outwardly beyond the outer surface of the cylindrical wall, and the shipping device including: a cylindrical container having an inner side surface, an open top and a closed bottom; a support member secured to the container and having a radially inwardly directed flange for supporting the flange portion of the top plate; a supplemental supporting system for positioning the heater unit assembly in the container at a spaced relation from the inner surface and bottom wall of the container; a cover for closing the top of the container; and container supporting means supporting the container in a manner to permit the container to be moved, relative to the supporting means, between a vertical position for loading and unloading the assembly and a horizontal position for transport of the assembly, the improvement comprising seal means interposed between said container and said cover for sealing the interior of said container from the environment, wherein said seal means comprise an O-ring of resilient material and said cover has a radially outwardly extending flange which is supported by said support member when said cover closes the top of said container and said support member has a groove receiving said O-ring at a location facing said cover flange.

2. A device as defined in claim 1 further comprising a retainer member secured within said cover for retaining the assembly top plate in contact with said support member when said cover closes the top of said container.

3. A device as defined in claim 2 wherein said retainer member is an annular plate secured to said cover.

4. A device as defined in claim 3 further comprising abutment means mounted on said container supporting means for supporting said bottom of said container, when said container is in the vertical position, in order to prevent said container from moving past the vertical position in the direction away from the horizontal position.

5. A device as defined in claim 4 wherein said abutment means comprise a horizontal beam.

6. A device as defined in claim 4 wherein said container supporting means comprise pivot means defining a horizontal axis about which said container pivots during movement between the horizontal and vertical positions and said abutment means are disposed to the side of the pivot axis which is opposite the side to which said container pivots during movement to the horizontal position.

7. A device as defined in claim 6 wherein said abutment means comprise a horizontal beam.

8. In a shipping device for a heater unit assembly, the heater unit assembly including a cylindrical wall having an outer surface and a top plate secured to the cylindrical wall and having a flange portion which projects radially outwardly beyond the outer surface of the cylindrical wall, and the shipping device including: a cylindrical container having an inner side surface, an open top and a closed bottom; a support member secured to the container and having a radially inwardly directed flange for supporting the flange portion of the top plate; a supplemental supporting system for positioning the heater unit assembly in the container at a spaced relation from the inner surface and bottom wall of the container; a cover for closing the top of the container; and container supporting means supporting the container in a manner to permit the container to be moved, relative to the supporting means, between a vertical position for loading and unloading the assembly and a horizontal position for transport of the assembly, the improvement comprising seal means interposed between said container and said cover for sealing the interior of said container from the environment, and a retainer member secured within said cover for retaining the assembly top plate in contact with said support member when said cover closes the top of said container.

9. A device as defined in claim 8 further comprising abutment means mounted on said container supporting means for supporting said bottom of said container, when said container is in the vertical position, in order to prevent said container from moving past the vertical position in the direction away from the horizontal position.

* * * * *